UNITED STATES PATENT OFFICE.

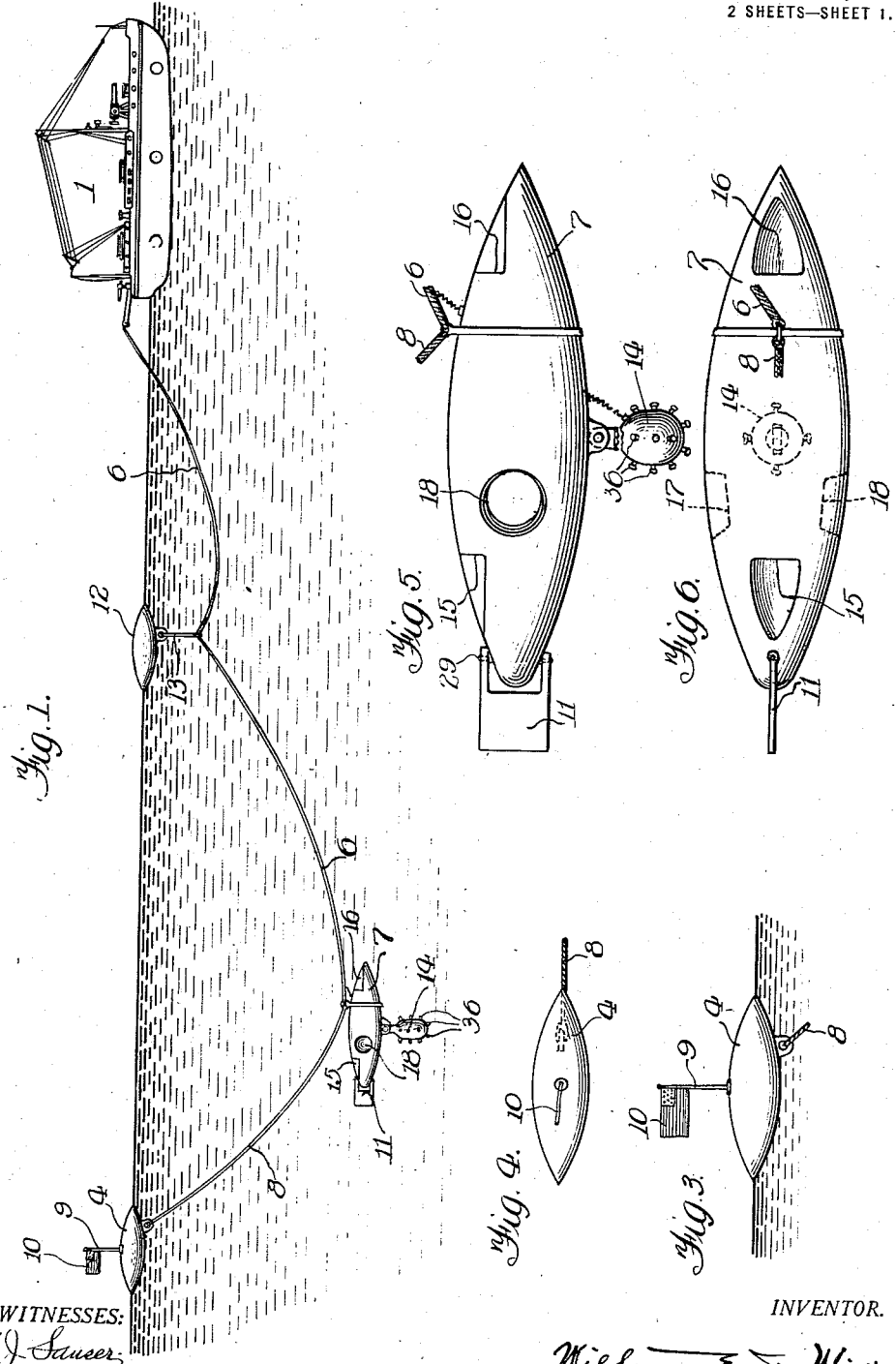

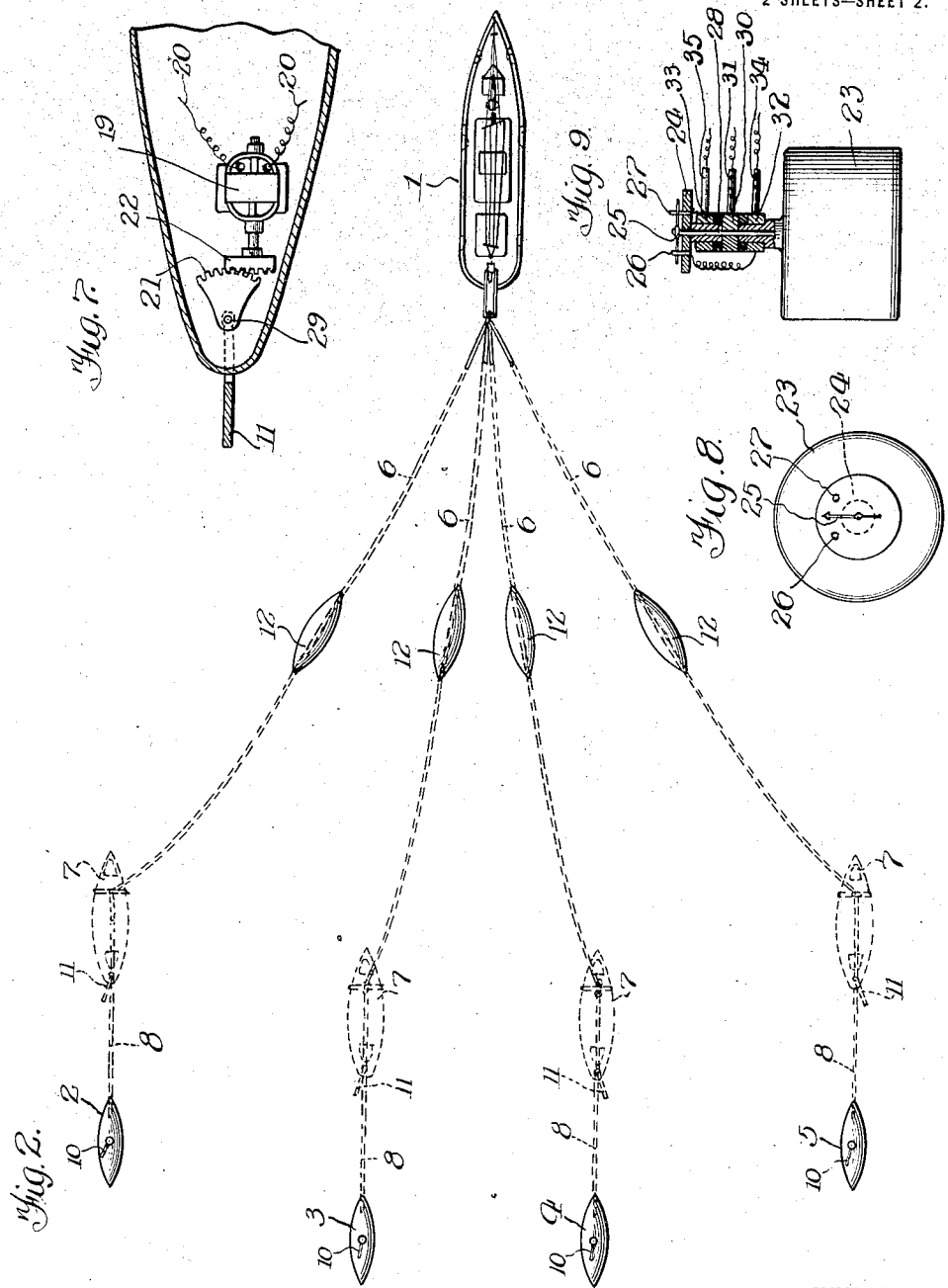

WILLIAM ERASTUS WILLIAMS, OF CHICAGO, ILLINOIS.

SUBMARINE DETECTING AND DESTROYING APPARATUS.

1,344,074.      Specification of Letters Patent.      Patented June 22, 1920.

Application filed May 18, 1917. Serial No. 169,547.

*To all whom it may concern:*

Be it known that I, WILLIAM ERASTUS WILLIAMS, a citizen of the United States, and a resident of Chicago, county of Cook, and State of Illinois, have invented a new and useful Improvement in Submarine Detecting and Destroying Apparatus, of which the following is a specification.

My invention relates to devices for detecting the presence and location of submarine vessels when they are submerged and invisible and also for destroying them while they are so submerged.

The object of my invention is to provide a trawling system wherein there is a series of more or less widely distributed floats supporting submerged mines and small submerged vessels in which there are located telephonic and magnetic detecting devices which are connected by electrical communicating cables to a main ship wherein a switchboard operator controls the various floats and submerged vessels and is informed by the apparatus carried by the submerged vessels, of the direction or presence of a submarine vessel. The invention is set forth in the claims.

Reference will be had to the accompanying drawings in which:

Figure 1 is a side elevation showing the main trawling ship connected to a set of floats and submerged vessels.

Fig. 2 is a plan of the devices of Fig. 1.

Fig. 3 is a side elevation of a single float from which a submerged vessel is supported.

Fig. 4 is a plan of the devices of Fig. 3.

Fig. 5 is a side elevation of a single submerged vessel which contains the detecting apparatus or indicators together with the explosive mine.

Fig. 6 is a plan of the devices of Fig. 5.

Fig. 7 is a plan diagram indicating an electric control for the rudder.

Fig. 8 is a plan diagram of a magnetic indicator.

Fig. 9 is an elevation in diagram of the structure of Fig. 8.

In the drawings 1 indicates the main ship and 2, 3, 4 and 5 indicate the several floats, each of which supports a submerged vessel 7. 6 indicates the main connecting cables from the trawler ship 1 to the submerged vessels 7. Each cable contains a series of electrical conductor wires and telephone wires suitably insulated and protected by armor wires carrying the mechanical strains involved.

The submerged vessels 7 are connected by any suitable cables 8 to the several floats 2, 3, 4 and 5 for the purpose of sustaining the submerged vessel in the position desired.

On the top of each of the floats 2, 3, 4 and 5 there are small flags 10 supported by staffs 9 that are intended to be visible from the main trawler ship so that the operator may be able to locate by sight and to control the positions of the several floats as indicated herein.

Each submerged vessel 7 is provided with a steering rudder 11 which is controlled in any suitable manner by any suitable electrical device connected through the main cable 6 to the switchboard on the main ship. In Fig. 7 I show this rudder 11 hinged at 29 and connected by a segment of a gear 21 to a spiral gear 22 on the shaft of a motor 19 connected by the electrical wires 20 which run through the cable 6 to the source of electrical control on the main ship. By means of the steering rudders 11 the submerged vessels 7 and their several floats may be drawn toward or separated from each other as the switchboard operator on the main vessel may desire.

In trawling service when a submarine is not more or less definitely located the several floats and their submerged vessels will be separated a considerable distance from each other and from the main trawling ship, and it will sometimes be desirable to support the main cables 6 by secondary floats 12 connected by small wire cable lines 13.

Each of the submerged vessels is provided with explosive mines 14 suspended beneath the bodies of the vessels 7. The mine acts as a means of maintaining the submerged vessel 7 in an upright position which is an aid to the sensitiveness of the indicating devices carried by the vessel.

Each of the submerged vessels 7 carries microphonic, telephonic transmitting diaphragms adapted to receive sound waves on different exposure directions as indicated by 15, 16, 17 and 18, see Fig. 6. The actual diaphragm itself is located inside the vessel a sufficient distance to allow a bell shaped orifice entrance to the diaphragm in order that each diaphragm will receive as much as possible only the sound waves approaching from its side for the purpose of indicating the direction of the origin of the sound.

The telephonic apparatus will be carefully adjusted and so balanced that each diaphragm or microphonic transmitter will respond to the same degree of intensity to the same sound stimulus so that when there is an appreciable difference in distance or direction of the sound stimulus as relates to the several diaphragms there will appear a difference in intensity to the operator at the switchboard on the main vessel and by this means he can locate the position of the submerged submarine sought to be located.

Any suitable telephonic apparatus may be used for this purpose and I have indicated only the location desired in which the transmitting diaphragms are to receive the sound waves.

In this system I provide also a magnetic indicator as well as a sound indicator. The magnetic indicators as well as the sound indicators or microphones are carried in the vessels 7 or they may be carried in the floats 2 to 5 inclusive.

The magnetic indicators may be any suitable apparatus for the purpose in which the approach or presence of any large body of metal such as iron or steel as represented by a submarine vessel will influence a magnetic needle and the latter in turn indicate to the operator on the main vessel the character of this magnetic disturbance, so that the variation in the disturbance that takes place at the several vessels 7 or their floats will give the direction of the submerged submarine.

While any suitable magnetic indicator may be used as I have described, an indicator in which a gyroscopic compass is used in connection with the magnetic needle may be succcessfully employed, the gyroscopic compass being set to normally point in the direction that the magnetic needle normally points and it is intended that this should be the case at all times regardless of the relative positions of the apparatus in relation to the earth's magnetic field. On the approach of a submarine vessel the magnetic needle will be disturbed but the gyroscopic compass will not and hence a variation will take place in the directional alinement of the two pointers. This variation will be indicated to the operator at the switchboard in the main ship through the medium of any suitable electrical communicating devices, the conductors of which are carried in the cables 6.

In Figs. 8 and 9 I have indicated in diagram the idea involved in this magnetic indicator. 23 indicates a box in which is located a gyroscopic compass of any suitable comstruction on the top of which there is mounted the indicator dial or disk 24 of this compass. The box 24 and the mechanism connected therewith are mounted to maintain a normal position regardless of the movements of the vessel in which it is carried in the manner customary with marine compasses and this mounting is not shown in the drawings. Mounted over the disk or dial 24 there is a sensitive compass needle 25 under full control of the earth's magnetism. Carried by the indicator dial 24 there are contact points 26 and 27 against which the magnetic needle 25 will touch whenever it is sufficiently disturbed from its normal position under the influence of the approach of a submarine vessel. The needle 25 is normally connected electrically through its pivot to the axis 28 of the gyroscopic compass dial 24. On the axis 28 there is what is termed commutator ring 30 electrically connected to the axis and in contact with a sensitive electrode brush 31. Mounted on the same axis 28 there are the collector rings 32 and 33 and these are insulated from the axis 28 and are in contact with the sensitive electrode brushes 34 and 35. The ring 33 is electrically connected to the contact point 27 and the ring 32 is likewise connected to the contact point 26, thus two different electric circuits may be made by variations of the magnetic needle with the dial of the gyroscopic compass and by means of this the operator on the main ship may determine the direction of the magnetic disturbance that takes place at the submerged vessels. The electrode wires of the sensitive brushes 31, 34 and 35 are carried through the main cable 6 along with the other communicating wires.

The mine 14 is provided with the ordinary exploding contact points 36, but these points 36 when depressed do not actuate the exploding devices of the mine but simply make or break an electrical circuit which will when the operator desires explode the mine through the medium of a switch under his control on board the main ship. Thus the mine is inert at all times save only when the operator sets it to be exploded by contact with a submerged vessel.

The mine is arranged to be quickly and easily detached from its supporting vessel for convenience in handling and transportation.

The exploding charge may be contained when desired in the submerged vessel 7 and not be a separate unit as I have indicated.

I may when desired place the indicating mechanism both magnetic and telephonic, or either one of them, in the several floats 2, 3, 4 and 5 and have the communicating cables attached directly to the floats.

Instead of connecting my cables directly to the submerged vessels 7 I may connect directly to the floats 2 to 5 inclusive and suspend the vessels 7 from the floats.

I may arrange the vessels 7 to be adjustably connected to the floats by means of automatic mechanism controlled electrically by the operator at the switchboard on the main vessel, so that he may vary the depth of the vessels as desired.

In place of my submerged vessels and floats being drawn through the water by the traction of cables I may provide each vessel with propelling means of its own, the power for which may be carried in the vessel itself or supplied through cable from the main ship and at the same time be controlled by the operator on the main ship.

My system would be more efficient if instead of the several floats I use small independent ships having their own propelling mechanisms and crews yet connected to the main trawler ship in the manner indicated. The advantages of the small floats and submerged vessels as I have indicated lies in the saving of expense and in the number of the men needed for the crews of the several ships or small boats.

When independent small boats are connected together in place of my floats as indicated of course each small boat would then carry its own submerged indicating apparatus and explosive mine, but at the same time would be connected to the switchboard operator in the main ship in a similar manner as when the floats are used.

When several ships are connected together in a trawling unit as I have indicated each having its own crews I will then provide an operator and a switchboard on each ship and each ship will have its indicating devices, and thus each operator may communicate with the other operators and compare their observations as to the direction of the submarine vessel sought to be located and destroyed.

Whenever it is suspected that the vessel sought to be destroyed is near, the mines will be set to explode on contact and the several submerged mines will be drawn together as closely as deemed necessary or desirable to be sure to come in contact with the vessel to be destroyed as the system is drawn through the water drawing the cables over the submerged vessel or submarine bringing a mine or mines in active contact with the submarine and thereby destroying it.

The difficulty in destroying submarines heretofore when submerged has been chiefly in locating their exact direction as they can be heard for a considerable distance by the sound produced by the mechanical operations of their machinery. With my system the direction and relative distances of submarines can be determined and hence when the region of the location of one is once known there is little chance of its making its escape when pursued with the equipment provided by my system.

What I claim is:

1. An apparatus for locating submarines composed of a series of submerged vessels separated from each other and supported by floats, each vessel carrying a contact mine and indicator devices, communicating cables connecting the indicating devices with a main trawler ship, means for moving the vessels with the indicating devices to and from each other under control from the main ship.

2. An apparatus for locating and destroying submarines composed of a series of detector devices separated from each other and connected to a main trawler ship, and adapted to be drawn through the water, said devices being provided with gyroscopic directional instruments in connection with magnetic needles normally alined in unison and electrical indicating devices adapted to register on the main ship a magnetic disturbance of the needle in relation to the gyroscopic directional pointer.

Signed at Chicago, in the county of Cook and State of Illinois, this 15th day of May, 1917.

WILLIAM ERASTUS WILLIAMS.

Witnesses:
ALBERT J. SAUSER,
H. M. ATHERTON.